Jan. 4, 1949.    J. A. CROWLEY, JR    2,458,350
METHOD AND APPARATUS FOR CONDUCTING
GAS-SOLID CONTACT OPERATIONS
Filed Dec. 14, 1944    2 Sheets-Sheet 2
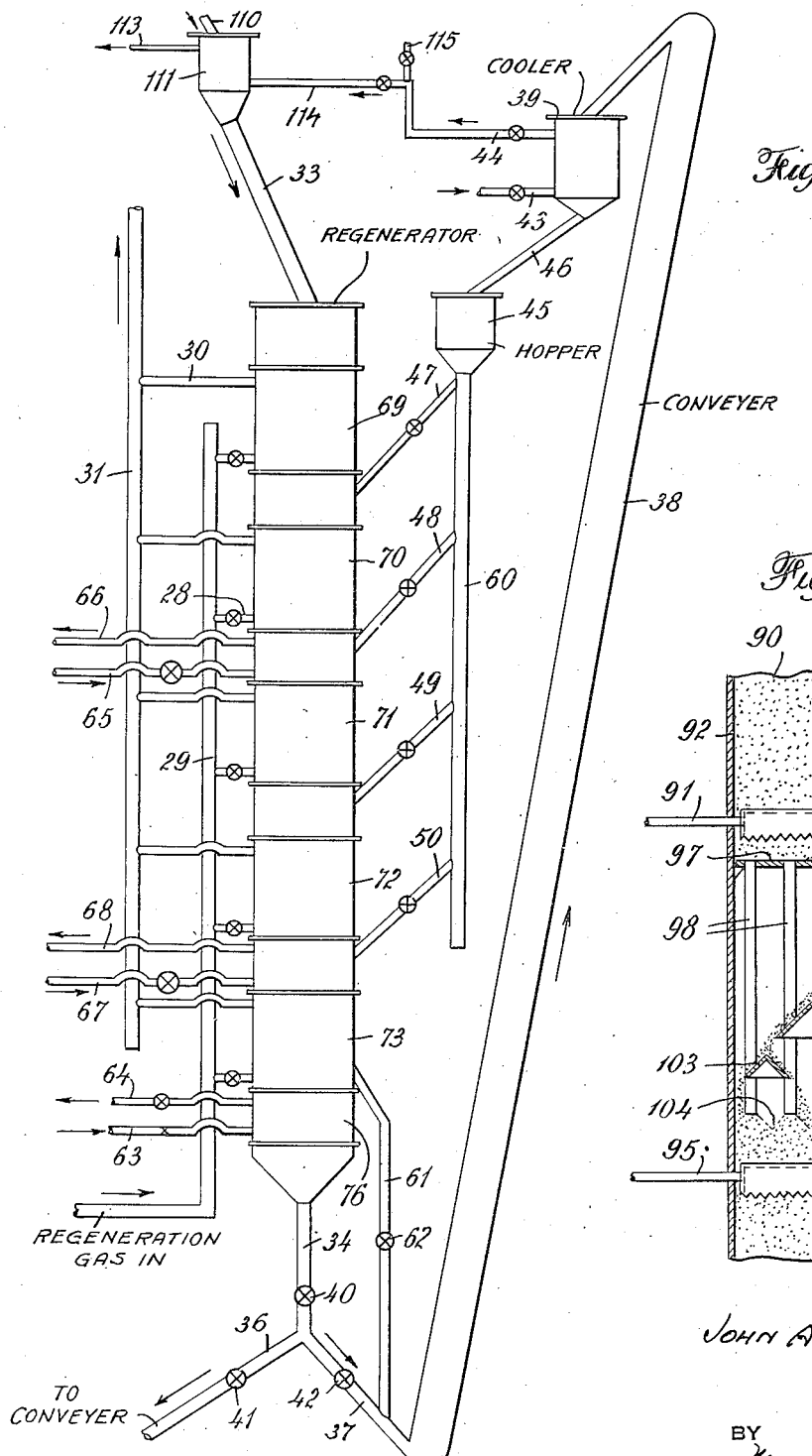
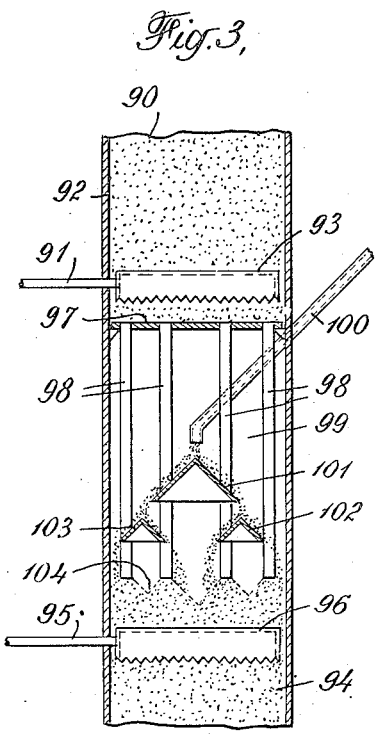
JOHN A. CROWLEY, JR.
INVENTOR Patented Jan. 4, 1949

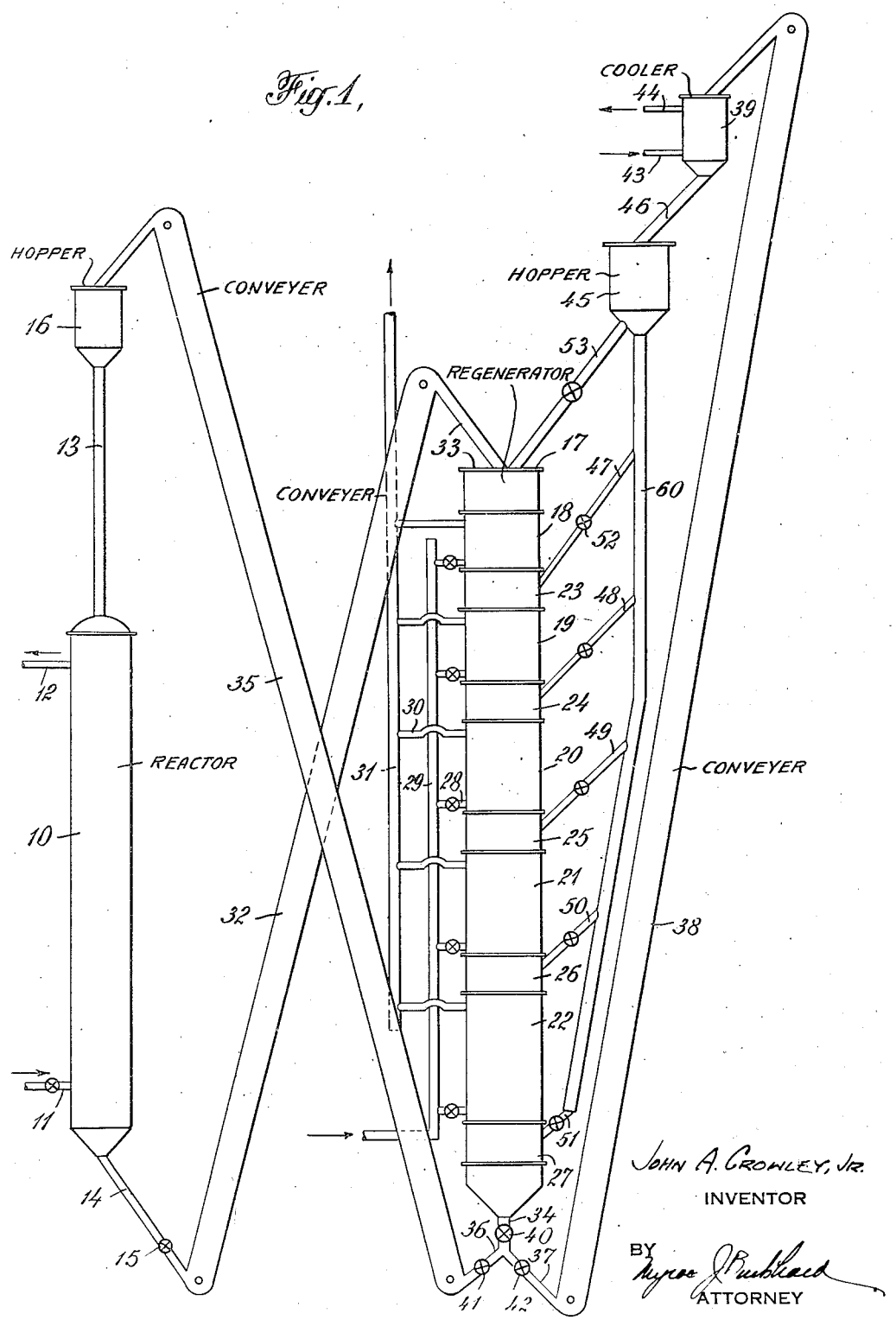

2,458,350

UNITED STATES PATENT OFFICE 2,458,350

METHOD AND APPARATUS FOR CONDUCTING GAS-SOLID CONTACT OPERATIONS

John A. Crowley, Jr., Scarsdale, N. Y., assignor to Socony-Vacuum Oil Company, Incorporated, a corporation of New York Application December 14, 1944, Serial No. 568,136

24 Claims. (Cl. 196—52)

This invention relates to processes wherein particle form solid materials are contacted with gaseous materials at elevated temperatures with a resulting change in heat level. Such processes may involve gas adsorption or desorption, or chemical reactions of various types. In the petroleum industry, such processes are of considerable importance and exemplary processes are the catalytic hydrogenation, dehydrogenation, polymerization, treating, desulfurization, reforming, polyforming, cracking and alkylation of hydrocarbons. Typical is the catalytic cracking conversion of hydrocarbons, it being well known that gas oils boiling in the range of 450° F. to 800° F. may be converted to gasoline and other products when contacted in the gaseous phase with particle form solid adsorbent materials at controlled conditions of temperature such as, for example, 800° F. and higher and at pressures usually above atmospheric. This reaction is generally endothermic in nature and involves a gradual drop in catalyst temperature unless heat is added from an external source. During the hydrocarbon conversion, carbonaceous contaminants are deposited upon the catalyst and gradually cause a loss in its catalytic activity. Such spent catalysts may be regenerated by controlled burning of the contaminants at elevated temperatures. The burning, of course, results in a considerable release of heat which would cause the catalyst to rise to a damaging temperature unless some method of temperature control is provided. Recently the above process has been developed as one wherein a particle form solid catalytic material continuously flows as substantially compact columns cyclically through two zones, one a reaction zone wherein it is contacted with hydrocarbons and the other a regeneration zone wherein it is contacted with a combustion supporting gas. The present invention is particularly directed toward processes of this latter type. The solid material involved in such catalytic processes may partake of the nature of natural or treated clays such as fuller's earth, Super Filtrol, bauxite or of various synthetic associations of alumina, silica, or alumina and silica, any of which may have other constituents added such as certain metallic oxides.

In the past in such processes as the above, catalyst temperature control has been accomplished by provision of heat transfer tubes in the reactors and/or regenerators and circulation of heat exchange fluids therethrough. In order to provide the proper heat exchange these tubes must be very carefully spaced and located within the contacting vessels and the resulting apparatus is often very complicated and costly both in fabrication and in operation.

It is a major object of this invention to provide in processes involving solid-gas contacting with resulting change of heat level, a method and apparatus for accomplishing the proper control of solid material temperature during the solid-gas contacting operation without the requirement of heat exchange tubes within the contacting zones or with a substantial reduction in the required amount of such heat transfer surface.

Another object is the provision of a simple and economical method and apparatus for regeneration of particle form solid contact mass materials at controlled elevated temperatures.

These and other objects will become more apparent in the following description of the invention. The above objects are accomplished by this invention by subjecting a part of the contacted solid material to a heat exchange operation to alter its temperature in a direction opposite to its change in the contacting zone and introducing controlled portions of the heat exchanged solid material to the contacting zone at a plurality of spaced intervals along its length. The solid material moving through the contacting zones is maintained as a substantially compact mass or column. The mixing of the heat exchanged solid material with the compact mass of moving solid material in the contacting zone permits very high heat exchange rates and effective temperature control without the need for heat transfer tubes.

The invention may be better understood by reference to the drawings of which Figure 1 is an elevational view of a preferred form of the invention showing a cyclic conversion system. Figure 2 is an elevational view of modified form of the invention and Figure 3 is an elevational view, partially in section, of a portion of a contacting vessel showing apparatus for introducing and distributing the heat exchanged solid material to the column of solid material in the contacting zone. All of these drawings are highly diagrammatic in nature.

Turning to Figure 1, 10 is a hydrocarbon conversion vessel having a hydrocarbon vapor inlet 11 and outlet 12, a solid material inlet conduit 13 and an outlet conduit 14 having a throttle valve 15 thereon. A hopper 16 is provided above the vessel 10 and is connected thereto through feed conduit 13. Also shown in Figure 1 is a regenerator vessel 17, which may be of any suitable crosssectional shape and which is divided into a plurality of burning stages 18—22 inclusive, and between each stage a section for solid material introduction sections 23—27 inclusive. Each burning stage is provided with a gas inlet, such as 28, supplied through manifold 29, and a gas outlet, such as 30, connecting into an outlet manifold 31. It will be noted that the successive stages are of progressively greater length for reasons discussed hereinafter. Suitable gas distributing and collecting members may be provided within each burning stage to insure uniform contact between gas and solid materials. The number of such stages required is dependent upon the particular process involved and may vary from two to fifty. A conveyor 32, which may be of any suitable construction is provided to convey spent solid material from the convertor outlet 14 to the regenerator inlet 33 at the upper end of the vessel 17. An outlet conduit 34 extends from the lower end of the vessel 17 and connects through conduit 36 to a conveyor 35 which conveys regenerated solid material to the hopper 16 above the conversion vessel. Another conduit 37 extends between the outlet conduit 34 and a conveyor 38 which conveys a portion of the regenerated solid material to a cooler 39 located above the regenerator. Valves 40, 41 and 42 are provided in conduits 34, 36, and 37, respectively, to permit proper control of the amount of solid material flow to the hopper 16 and cooler 39. The cooler 39 is provided with an inlet 43 and outlet 44 for heat exchange fluid. The cooler may be any of a number of types; for example, it may be of the indirect heat transfer type provided with heat transfer tubes through which a suitable liquid or gaseous heat exchange fluid is circulated. On the other hand, the cooler may be of the direct contact type, wherein a gas is passed directly through the mass of solid material in direct contact therewith for the purpose of removing heat. A surge hopper 45 is located below the cooler 39 and a conduit 46 is connected therebetween for passage of cooled solid material. A manifold 60 extends downwardly from the hopper 45 and individual pipes 47—51 inclusive connect between said manifold and the sections 23—27 inclusive, respectively, of the regenerator. A valve, such as 52, is provided on each feed pipe to permit control of the amount of solid flow. Another feed conduit 53 is provided between the hopper 45 and the upper end of the regenerator 17.

In operation, freshly regenerated solid material passes from hopper 16 through conduit 13 into the conversion vessel 10 wherein it is contacted with hydrocarbon vapors entering through conduit 11 and leaving through conduit 12. Spent regenerated material, at temperatures of the order of 750° F. to 900° F. pass from the lower end of the vessel 10 through conduit 14 to conveyor 32. The rate of solid material flow is throttled by means of valve 15 so as to maintain the vessel 10 substantially filled with solid material. The spent solid material is discharged from conveyor 32 through conduit 33 into the upper end of the regenerator and then passes downwardly therethrough as a substantially compact column. It is contacted in each successive stage with air which acts to burn off the contaminant deposit and thereby release large quantities of heat. Thus sufficient combustion may occur in stage 18 to heat the solid material to about 1000° F.—1050° F. Obviously, unless heat is removed from the solid material at this point, it will be heated to a temperature of the order of 1250° F. or higher in the next stage which would cause heat damage to the solid material. (Assuming the particular solid material in use is heat damaged by temperatures substantially in excess of 1150° F.) In order to avoid this, cooled regenerated solid material is introduced through inlet pipe 47 into section 23 at such a rate as to cool the mass of solid material entering stage 19 to about 900° F. or lower. Due to the very high rate of heat transfer between particles so mixed, very little space is required to accomplish the cooling of the contact mass to the desired temperature. The addition of regenerated solid particles to the main stream which still bears a heavy contaminant deposit tends to decrease the average percentage of the contaminant deposit and as a result tends to discourage excessive localized or zone burning which usually is encountered in burning very heavy contaminant deposits. In other words, the dilution of the contaminated solid material with regenerated solid material tends to prevent the contaminant burning from occurring in localized zones near the air inlet instead of throughout the burning stage. The retardation of such localized zone burning permits better temperature control throughout the stage and higher overall burning rates. The addition of regenerated solid material also provides additional heat absorbing capacity for the next burning stage, thereby permitting for the same temperature rise, more contaminant burning between cooling sections than could be permitted without the dilution effect of the regenerated solid material. As a consequence, successive burning stages may be increased in length as additional amounts of regenerated solid material is added at intervals down the regenerator. Going back to the solid flow through the regenerator, the mixed regenerated and spent solid material may enter burning stage 19 at 900° F. and leave that stage at 1100° F. More cooled regenerated solid material is introduced through pipe 48 and the operation is repeated on down the regenerator. The solid material leaving the final burning stage 22 at about 1100° F. may be cooled to about 900° F. by addition of cooled regenerated solid material through pipe 51 into section 27. Part of the regenerated solid material then passes through conduits 34 and 36 to conveyor 35 and thence to hopper 16 for another pass through the conversion vessel. The remainder of the regenerated solid material passes through conduits 34 and 37 to conveyor 38 and thence through cooler 39 wherein it is cooled to a suitable temperature, 200° F. for example. The cooled material passes into the surge hopper 45 from which it may be withdrawn as shown hereinabove. Air passes from a compressor (not shown), either with or without preheat, through manifold 29 into separate inlets 28 to each burning stage. Spent regeneration gas passes from each stage through outlets 30 and outlet manifold 31.

In some operations wherein the temperature of the solid material entering the regenerator through 33 may be initially high and/or wherein the contaminant deposited thereon may be unusually high, it may be desirable to add controlled amounts of the cooled regenerated solid material to the upper end of regenerator through pipe 53 as well as at a plurality of spaced locations therebelow. In this connection it should be noted, however, that the addition of all the cooled regenerated solid material to the top of the regenerator to the exclusion of the inlet locations therebelow would be highly undesirable. The principal objection is that the amount of heat released in burning off a normal contaminant deposit is so great that in order to prevent overheating of the solid material, either an impractical and excessive amount of slightly cooled, solid material would have to be added at the top of the regenerator or such an amount of substantially cooled solid material would have to be added as would cool the mixed inlet solid material below a combustion temperature, thereby preventing combustion entirely. The introduction of the cooled regenerated solid material at a plurality of spaced intervals has a further advantage in that it permits regeneration at a higher overall temperature, thereby permitting higher regeneration rates.

In some operations the temperature of the spent solid material entering through conduit 33 may be below an active combustion temperature. In such cases it is desirable to effect the exchange of some of the heat recovered from cooling the regenerated solid material in cooler 39 with the spent inlet solid material to raise the temperature of the latter. This may be accomplished in a number of ways which will be obvious to those skilled in the art.

Turning now to Figure 2, we find a regenerator somewhat similar to the one shown in Figure 1, like parts bearing like numerals. This regenerator may be used either alone, as could the one of Figure 1, or in conjunction with a reactor (not shown). The regenerator differs from that of Figure 1 mainly in that it is adapted for accomplishing the solid material temperature control partially by use of cooled regenerated solid material and partially by other means. Thus inlet and outlet pipes for heat exchange fluid are provided to and from some of the sections between burning stages as well as solid material inlet pipes. (See 65, 67 and 66, 68.) The cooling by fluid heat exchange may be of the direct or indirect contact type with proper internal construction of conventional design in the sections adapted therefor. In the section 76 below the lowermost burning stage, similar heat exchange fluid inlet 63 and outlet 64 are provided and the cooled solid material inlet eliminated.

In operation, the solid material passing between successive burning stages is cooled by the addition and mixing therewith of controlled amounts of cooled regenerated solid material and at some sections (all, if preferred), additionally cooled by heat exchange with a suitable heat exchange fluid. Part of the regenerated solid material is adjusted in temperature level by heat exchange with a suitable fluid in section 76 and then withdrawn through conduits 34 and 36 for use in a conversion vessel or other apparatus (not shown). The remaining regenerated material may also be subjected to temperature adjustment in section 76 and then withdrawn through conduits 34 and 37 to conveyor 38, or the remainder may be withdrawn from the regenerator above section 76 through conduits 61 and 37 to conveyor 38 and thence to cooler 39.

This modified type of apparatus is desirable in operations involving unusually heavy deposits of contaminant on the catalytic material, since the use of cooled regenerated catalyst re-circulation reduces to within practical limits the amount of cooling to be accomplished within the renegerator by fluid heat exchange and on the other hand, the partial use of fluid heat exchange eliminates the necessity for the excessive amount of catalyst re-circulation that would otherwise be required for proper temperature control during the burning of very heavy contaminant deposits. It will be noted that the burning stages in the regenerator of Figure 2 are all of substantially equal length. Such construction is less preferable, although not entirely unsatisfactory, when the entire temperature control load is to be handled by cooled catalyst re-circulation as in Figure 1. In the latter type of apparatus successively longer burning stages are preferable, not only because of the reduction of the total required number of stages and apparatus cost resulting therefrom, but also because it is desirable from an operation standpoint to control the solid material contact period in each stage either equal in length or of increasing length in successive stages.

As was pointed out hereinabove in some operations the spent solid material entering the regenerator may require pre-heating to a suitable temperature for contaminant combustion. If desired this may be accomplished by passing the spent solid material from conduit 110 through a heat exchanger 111 and thence through conduit 33 to the regenerator. Part of the heat removed from the regenerated solid material in cooler 39 may be used for this purpose by passage of heat exchange fluid issuing from cooler 39 through pipe 44 into heat exchanger 111 through pipe 114. The heat exchange fluid may be removed from heat exchanger 111 through pipe 113. Any portion of the heat exchange fluid from cooler 39 not passed through heat exchanger 111 may be removed from the system through pipe 115.

In either of the above modifications it is important to provide uniform mixing of the cooled regenerated solid material with the main stream of regenerating solid material at a plurality of levels along the regenerator. A preferred design for accomplishing this is shown in Figure 3, wherein 90 is a section of a regenerator, such as shown in Figure 1, 91 is a gas inlet pipe to a burning stage 92, and 93 is a gas distributing member within said stage. Therebelow is shown the upper section of another burning stage 94, having gas outlet pipe 95 and gas collecting member 96. A partition 97 is supported across the vessel at the bottom of stage 92 and pipes 98 depend downwardly therefrom for passage of the solid material to stage 94, thereby providing a substantially solid material free chamber 99 between the superposed burning stages. A solid material inlet pipe 100 extends into the space 99 and a number of inverted conical shaped baffles, such as 101, 102 and 103, are supported by suitable means below the outlet of pipe 100 within the space 99 in such a way as to distribute the solid material flowing from pipe 100 uniformly across the vessel cross-section. The regenerated cooled solid material thus distributed may mix uniformly at surface 104 with the regenerating solid material passing from pipes 98.

The method and apparatus of this invention may be also applied to regenerators or reactors wherein the burning zone consists of only a single substantially continuous stage, as for example, zones having a gas inlet near one end and a gas outlet near the opposite end. In such applications, suitable baffle members should be provided to insure proper mixing of the cooled regenerated catalyst with the main compact stream of regenerating catalyst. It should be understood that the term "contact zone," as used in claiming this invention is intended in a sense sufficiently broad to include a single contact stage or a plurality of contact stages.

As has been hereinbefore stated, the invention may be applied to many processes other than the regeneration of contact mass material. For example, the conversion vessel 10 of Figure 1 may be also provided with externally located means for altering the temperature of part of the spent catalyst and introduction thereof into the reactor at a plurality of levels. Since the hydrocarbon conversion reaction is endothermic in nature, the recycle catalyst would be heated instead of cooled before introduction into the reactor.

It will be understood that the arrangement of external cooler 39 and hopper 45, shown in Figures 1 and 2 is an optional although preferred arrangement. Optionally, the cooler 39 could be located below the regenerator and between the regenerator and conveyor 36. In fact, the lower end of the regenerator may be extended and means for cooling the regenerated solid material provided within the extended section.

The amount of contacted solid material to be heat exchanged and introduced into the contacting vessel is largely dependent upon the particular process involved and the particular operating conditions. It is also dependent upon the temperature to which the contacted solid material is cooled or heated before re-introduction into the contacting zone. The proper distance between levels of cooled solid material introduction varies depending upon the rate of solid material flow and the rate of change in heat level of the particular reaction involved. It is also dependent upon the amount of spread between the minimum temperature which will support the reaction and the temperature above which the solid material would suffer heat damage. The proper spacing of the points of cooled solid introduction may be calculated once the condition of operation and the above factors are determined. In an exemplary operation, namely, the regeneration of a clay-type particle form catalytic material used for hydrocarbon conversion, which material bears a carbonaceous contaminant deposit of about 2.5% by weight, satisfactory catalyst temperature control within the range of about 900° F. to 1150° F. may be obtained by the use of a regenerator having about five burning stages of progressively increasing length with sections for cooled regenerated catalyst introduction between each stage and having auxiliary means to adjust the temperature of the regenerated catalyst. In this operation the regenerated solid material is cooled to a temperature of about 125° F. The sum total of cooled regenerated catalyst introduced to all the spaced levels along the regenerator amounts to about 0.5 to 0.6 of a pound of cooled regenerated catalyst per pound of spent catalyst regenerated.

The values given hereinabove are merely typical and are not to be construed as limiting the invention thereto. Thus for regeneration of hydrocarbon conversion catalysts, depending upon the desired operating conditions, the number of levels of cooled catalyst introduction may vary from 2 to 40 and the amount of cooled regenerated catalyst introduced into the regenerator may vary from 0.1 to 6 pounds per pound of catalyst regenerated. This catalyst may be externally cooled before introduction to the regenerator to temperatures varying from about 100° F. to about 750° F.

It should be understood that the invention is not to be limited to the particular details of structure, operation or adaptation herein disclosed, but is to be limited only by the following claims.

I claim:

1. An apparatus for conducting gas-solid contact operations involving change in heat level which apparatus comprises: a substantially vertical elongated vessel adapted for conducting gas-solid contacting, means to pass a particle form solid material downwardly through said vessel as a substantially compact column, means to substantially change the heat level of at least a part of the contacted solid material particles, a receptacle outside of said vessel, a plurality of downwardly sloping conduits communicating said receptacle with said vessel at a plurality of vertically spaced levels, said conduits extending downwardly into said vessel at a substantial slope with the horizontal so as to permit gravity flow of said solid from said receptacle to said vessel substantially independently of contact and carrier fluid and means to deliver at least part of said solid material, so changed in heat level to said receptacle.

2. An apparatus for conducting gas-solid contact operations involving change in heat level which apparatus comprises: a substantially vertical elongated vessel adapted to confine a substantially compact continuous column of particle form material substantially throughout its length, an inlet for introduction of contacting gas to said vessel at at least one level, an outlet for withdrawal of contacted gas from said vessel at at least one other level, a separate inlet for particle form solid material connected to the upper end of said vessel, a separate outlet for contacted solid material from the lower end of said vessel, heat exchange means located outside of said vessel adapted to substantially alter the temperature level of part of said contacted solid material in a direction opposite to its change within said vessel, a hopper located outside of said vessel, means to deliver at least part of said solid material so altered in temperature to said hopper, conduit means extending downwardly from said hopper and connecting into said vessel at a plurality of vertically spaced levels, said conduit means extending downwardly at a sufficient angle with the horizontal to insure gravity flow of contact material from said hopper into said vessel, wherein said hopper is positioned vertically above said plurality of vertical levels at which said conduit means connect into said vessel, and flow throttle devices on said conduit means positioned to permit separate control of the solid flow into said vessel at each of said levels.

3. An apparatus for conducting gas-solid contact operations involving change in heat level which apparatus comprises: a substantially vertical elongated vessel, a plurality of vertically spaced apart sets of vertically spaced gas inlet means and gas outlet means along the length of said vessel serving to divide it into a plurality of vertically spaced apart superposed communicating contact stages, means to admit particle form solid material to the upper end of said vessel, means to withdraw contacted solid material from the lower end of said vessel at a throttled rate so as to maintain the flow of said solid material within said vessel as a substantially compact mass, means located outside of said vessel to substantially alter the temperature level of part of said contacted solid material in a direction opposite to its change within said vessel, solid introduction tubes connecting into said vessel at levels between at least most of said sets of gas inlet and outlet means, and means to supply contact material to said tubes from said means to alter the temperature level of said contacted solid material.

4. An apparatus for regeneration of particle form solid contact mass materials by contaminant combustion which apparatus comprises: a substantially vertical elongated vessel, a plurality of vertically spaced sets of vertically spaced inlet means and gas outlet means along the length of said vessel to provide a plurality of vertically spaced, superposed, communicating combustion stages within said vessel, means to admit contaminant bearing particle form solid contact mass material to the upper end of said vessel, means to withdraw regenerated solid material from the lower end of said vessel at a throttled rate so as to maintain the flow of solid material serially through said stages as a substantially compact continuous column, externally located solid material cooling means and means to pass a controlled fraction of the regenerated solid material therethrough, means to introduce controlled portions of said cooled regenerated solid material into said vessel at at least most of those levels between said stages and means to pass a cooling fluid in heat exchange relationship with the flowing solid material within said vessel at at least some of the levels between said stages.

5. An apparatus according to claim 4 further characterized by means to exchange part of the heat removed from said regenerated solid material in said cooling means with the spent solid material entering said vessel.

6. In an apparatus wherein a particle form solid contact mass material is passed cyclically through separate reaction and regeneration zones, apparatus for conducting the regeneration of the contaminant bearing solid material from the reaction zone which apparatus comprises: a substantially vertical elongated vessel, inlet means for spent solid material at the upper end thereof, outlet means for part of the regenerated solid material at the lower end thereof, outlet means for the remainder of the regenerated solid material vertically spaced above said first named outlet means, throttling means associated with both said outlet means to maintain the flow of solid material within said vessel as a substantially compact mass, means located within said vessel between said first and second outlet means to adjust the temperature of the solid material passing to said first named outlet means to a level suitable for said reaction zone, means to pass a combustion supporting gas in contact with said solid material within said vessel above said second named outlet, externally located means to cool the solid material flowing from said second named outlet and means to pass said solid material therethrough and means to admit portions of said cooled solid material to said vessel at a plurality of spaced levels above said second named outlet.

7. An apparatus for conducting exothermic regeneration of spent particle form solid contact mass materials at controlled elevated temperatures which apparatus comprises: a substantially vertical elongated vessel, means to pass said solid material downwardly through said vessel as a substantially compact continuous column, means to pass combustion supporting gas in contact with said moving solid material within said vessel to accomplish the regeneration thereof, a cooler adapted for removing heat from particle form solid material located at a level above said vessel, means to pass a controlled portion of the regenerated solid material therethrough, means to admit portions of said cooled solid material to said vessel at a plurality of vertically spaced levels to provide control of the temperature range of the solid material during its regeneration.

8. An apparatus according to claim 7 characterized by the fact that one of said means to admit cooled solid material to said vessel is located at the top of said vessel.

9. An apparatus for conducting gas-solid contact operations involving change in heat level which apparatus comprises: a substantially vertical elongated vessel, a plurality of vertically spaced sets of gas inlet and outlet means along the length of said vessel to provide a series of superposed, vertically spaced contact stages, the gas inlet and outlet means in each successive stage being spaced so as to provide stages successively increasing in vertical length from the top stage to the lowermost stage, means to admit particle form solid material to the upper end of said vessel, means to substantially separately withdraw contacted solid material from the lower end of said vessel at a throttled rate so as to maintain the flow of said solid material within said vessel as a substantially compact mass, means located outside of said vessel to substantially alter the temperature level of part of said contacted solid material in a direction opposite to its change within said vessel, means to introduce controlled portions of said solid material so altered in temperature level, in the substantial absence of contacting gas flow, into the flowing mass of solid material within said vessel at the levels between superposed contact stages.

10. Apparatus for regeneration of spent contact mass materials by contaminant combustion at controlled elevated temperatures which apparatus comprises: a substantially vertical elongated vessel, a plurality of partitions across said vessel at vertically spaced intervals dividing it into a series of superposed stages, uniformly spaced conduits depending from each of said partitions and terminating a spaced vertical distance therebelow to provide passages for solid material flow from stage to stage and to provide substantially solid material free chambers between stages, gas inlet means to each stage and gas outlet means from each stage, means to admit said solid material to the upper end of said vessel, means to withdraw solid material from the lower end of said vessel, throttling means associated with said withdrawal means, a cooling apparatus located outside of said vessel, adapted for cooling particle form solid material, means to pass a controlled portion of the regenerated solid material through said cooling apparatus, means to introduce controlled portions of the cooled solid material to said chambers within said vessel between said stages, baffling means within said chambers to distribute said cooled solid material substantially uniformly across the vessel cross-section.

11. The method for conducting gas-solid contact operations involving a change in heat level which comprises: passing a particle form solid material as a substantially compact column downwardly through a contacting zone while contacting it therein with a gaseous material, changing the temperature level of at least part of the contacted solid material in a direction opposite to its change in said contacting zone and admitting, in substantial absence of fluid material flow controlled portions of said solid material so altered in temperature level to said contact zone at a plurality of vertically spaced levels along its length to effect control of the temperature range of the solid material passing through said zone substantially solely by means of said solid material so admitted at said plurality of vertically spaced levels.

12. The method of conducting thermochemical reactions involving gaseous and particle form solid materials at controlled elevated temperatures which comprises the steps: maintaining a substantially compact confined column of downwardly flowing particle form solid material, replenishing said column at its upper end and withdrawing contacted solid material from the lower section thereof, introducing reactant gas into said column at at least one location along its length and withdrawing gas therefrom at at least one other spaced location, subjecting at least part of the contacted solid material to heat exchange so as to substantially change the temperature level thereof in a direction opposite to its change during contact with said gas, conducting at least a part of said heat exchanged solid material to an accumulation zone maintained apart from said column and passing said heat exchanged solid material as a plurality of downwardly gravitating confined streams from said accumulation zone into said confined column at a plurality of spaced levels along its length so as to effect at least a major portion of the control of the solid material temperature within set limits during its contact with said gas solely by means of said contact material from said accumulation zone.

13. A method for regenerating contaminant bearing particle form solid contact mass material comprising the steps: passing said contaminant bearing solid material as a substantially compact column of moving particles through a confined regeneration zone while contacting it with a combustion supporting gas within said zone, cooling a controlled portion of the regenerated solid material in a separate zone, introducing controlled portions of the cooled solid material, independently of said combustion supporting gas, into said regeneration zone at a plurality of spaced intervals along its length in such a way as to uniformly mix it with the solid material in said column within said zone, the amounts of said cooled solid material introduced at each interval being adjusted to maintain the solid material within a predetermined temperature range throughout its passage through the regeneration zone.

14. A method for regenerating contaminant bearing particle form solid contact mass material comprising the steps: passing said contaminant bearing solid material as a substantially compact column of moving particles through a confined regeneration zone, passing a different controlled stream of combustion supporting gas into contact with said solid material to burn the contaminant thereon in each of a vertical series of sections along the length of said column, cooling a controlled portion of the regenerated solid material in a separate zone, introducing controlled portions of the cooled solid material, independently of said combustion supporting gas, into said regeneration zone at a plurality of spaced intervals along its length in such a way as to uniformly mix it with the solid material in said column within said zone, the amounts of said cooled solid material introduced at each interval being adjusted to maintain the solid material throughout its passage through said regeneration zone above the minimum level required for active contaminant combustion and below a level which would cause heat damage to said solid material.

15. The method of claim 13 which includes the further step of exchanging part of the heat removed from said solid material during cooling with said contaminant bearing solid material entering said regeneration zone to raise the temperature of said contaminant bearing solid material to a level conducive of rapid contaminant combustion rates.

16. The method for conducting gas-solid contact operations involving change in heat level which method comprises: maintaining a substantially compact, confined column of downwardly flowing particle form solid material, replenishing said column at its upper end and withdrawing contacted solid material from the lower section of said column, passing gas in contact with said solid material at a plurality of vertically spaced contact stages along said column while maintaining sections substantially free of gas flow intermediate said contact stages, subjecting a controlled portion of the contacted solid material to heat exchange to alter its temperature in a direction opposite to its change within said contact stages, introducing controlled amounts of said heat exchanged contact material into said column uniformly across its cross-section at at least most of the gas flow free zones intermediate said contact zones so as to control the temperature of the solid material within a set range throughout said contact zones.

17. The method of regenerating a contaminant bearing particle form solid contact mass material at controlled elevated temperatures which method comprises: passing a particle form solid material through a series of combustion stages in each of which it flows as a substantially compact column of solid particles, passing controlled amounts of combustion supporting gas in contact with said solid material in each of said stages, cooling a controlled amount of the regenerated solid material passing from the last stage in the series, uniformly adding controlled portions of said cooled solid material, independently of said combustion supporting gas, to the solid material passing between at least most of said stages and passing a cooling fluid in heat exchange relationship with the solid material passing between at least some of said stages, the amounts of cooled solid material and heat exchange fluid so employed between stages being controlled to maintain the temperature of the solid material during its passage through said stages above that minimum required for rapid contaminant combustion and below a temperature that would cause heat damage to said solid material.

18. The method of conducting a gas-solid contact operation involving change in heat level which method comprises: passing a particle form solid material through a series of contact stages, the flow in each stage being as a substantially compact column of solid particles, passing a contact gas in contact with the solid material in each of said stages while substantially preventing the interflow of gas between stages, subjecting a predetermined portion of the solid material passing from the last stage in series to heat exchange to change its temperature level in a direction opposite to its change in said contact stages, mixing controlled portions of said heat exchanged solid material with the solid material flowing between at least most of said stages to control the temperature of the solid material within set limits during its passage through said stages.

19. A continuous cyclic process for hydrocarbon conversion which comprises: passing a particle form solid contact mass material through a conversion zone wherein it is contacted with hydrocarbons at an elevated temperature, substantially removing the hydrocarbon vapors from the resulting spent contact mass material, passing said spent contact mass material as a substantially compact column through a series of superposed substantially vertical combustion stages, passing a combustion supporting gas in contact with said contact mass material in each of said stages to burn off contaminant deposits, substantially cooling a controlled portion of the regenerated contact mass material passing from the last in series of said contact stages, introducing controlled portions of said cooled contact mass material, independently of said combustion supporting gas, into said column at locations substantially between at least most of said stages to mix with the contact material and to control the temperature of the contact mass material passing through said stages within predetermined limits, adjusting the temperature of the remaining regenerated contact mass material to about the desired conversion temperature and passing said contact mass material to the conversion zone.

20. The method of claim 12 characterized in that one portion of said heat exchanged solid material is introduced into the top of said column.

21. The method of regenerating a contaminant bearing particle form solid contact mass material at controlled elevated temperatures which comprises: passing a particle form solid material through a series of combustion stages in each of which it flows as a substantially compact column of solid particles, said stages progressively increasing in length, passing controlled amounts of combustion supporting gas in contact with said solid material in each of said stages, cooling a controlled amount of the regenerated solid material passing from the last stage in the series, uniformly adding controlled portions of said cooled solid material to the solid material passing between said stages to control the temperature of the solid material passing through said stages above that minimum required for rapid contaminant combustion and below a heat damaging level.

22. A method for regenerating a particle form solid contact mass material which has become spent by deposit thereon in a reactant conversion zone of a contaminant which comprises the steps: passing said contaminant bearing solid material as a substantially compact column of moving particles through a confined regeneration zone while contacting it with a combustion supporting gas within said zone, cooling a controlled portion of the regenerated solid material in a separate zone, introducing controlled portions of the cooled solid material, independently of said combustion supporting gas, into said regeneration zone at a plurality of spaced intervals along its length in such a way as to uniformly mix it with the solid material in said column within said zone, the amounts of said cooled solid material introduced at each interval being adjusted to maintain the solid material within a predetermined temperature range throughout its passage through the regeneration zone, and exchanging part of the heat removed from said regenerated solid material during cooling with said contaminant bearing solid to said regeneration zone so as to raise the temperature of said contaminant bearing solid material to a level conducive of rapid contaminant combustion rates.

23. The method for regenerating contaminant bearing finely divided solid contact mass material comprising the steps: passing said contaminant bearing solid material through a confined regeneration zone while contacting it with a combustion supporting gas within said zone to burn off said contaminant, withdrawing hot regenerated solid material from said combustion zone, cooling said regenerated solid material in a separate zone, and exchanging at least part of the heat removed from said regenerated solid material with said contaminant bearing solid material after all of the contaminant has been deposited thereon which is to be deposited and prior to the introduction of said contaminant bearing solid material into said regeneration zone so as to raise the temperature of said contaminant bearing solid material.

24. An apparatus for conducting gas-solid contact operations involving change in heat level which apparatus comprises: a substantially vertical elongated vessel adapted for conducting gas-solid contacting, means to pass a particle form solid material downwardly through said vessel as a substantially compact column, means to substantially change the heat level of at least a part of the contacted solid material particles, solid introduction devices connecting into said vessel at a plurality of vertically spaced levels, adapted to deliver at least part of the contacted solid material, so changed in heat level, to said vessel at a plurality of vertically spaced levels independently of a suspending fluid, a plurality of vertically spaced apart sets of heat transfer tubes positioned within said vessel and means to pass a cooling fluid through said tubes.

JOHN A. CROWLEY, Jr.

REFERENCES CITED

The following references are of record in the file of this patent:

UNITED STATES PATENTS

| Number | Name | Date |
|---|---|---|
| 2,161,974 | Peck | June 13, 1939 |
| 2,239,801 | Voorhees | Apr. 29, 1941 |
| 2,320,318 | Simpson et al. | May 25, 1943 |
| 2,320,562 | Bransky | June 1, 1943 |
| 2,331,433 | Simpson et al. | Oct. 12, 1943 |
| 2,344,449 | Ogorzaly | Mar. 14, 1944 |
| 2,356,680 | Marancik et al. | Aug. 22, 1944 |
| 2,362,621 | Fahnestock | Nov. 14, 1944 |
| 2,364,453 | Layng et al. | Dec. 5, 1944 |
| 2,367,281 | Johnson | Jan. 16, 1945 |
| 2,369,523 | Belchetz | Feb. 13, 1945 |
| 2,379,408 | Arveson | July 3, 1945 |
| 2,409,353 | Giuliani et al. | Oct. 15, 1946 |
| 2,412,025 | Zimmerman | Dec. 3, 1946 |

FOREIGN PATENTS

| Number | Country | Date |
|---|---|---|
| 533,037 | Germany | Sept. 8, 1931 |

Certificate of Correction

Patent No. 2,458,350.

January 4, 1949.

JOHN A. CROWLEY, Jr.

It is hereby certified that errors appear in the printed specification of the above numbered patent requiring correction as follows:

Column 5, line 72, for "renegerator" read *regenerator*; column 10, line 63, claim 10, for the syllable "tweeen" read *tween*; column 14, line 8, claim 22, after the word "solid" insert *from said conversion zone prior to passing said contaminant bearing solid*;
and that the said Letters Patent should be read with these corrections therein that the same may conform to the record of the case in the Patent Office.

Signed and sealed this 7th day of June, A. D. 1949.

[SEAL]

THOMAS F. MURPHY,
*Assistant Commissioner of Patents.*